United States Patent [19]

Hoover

[11] 4,370,750
[45] Jan. 25, 1983

[54] EXTENDED RANGE X-RAY TELESCOPE

[75] Inventor: Richard B. Hoover, Huntsville, Ala.

[73] Assignee: The United States of America as represented by the Administrator of the National Aeronautics and Space Administration, Washington, D.C.

[21] Appl. No.: 263,828

[22] Filed: May 15, 1981

[51] Int. Cl.³ .................... G02B 23/06; H05G 1/00
[52] U.S. Cl. .................................. 378/43; 378/2
[58] Field of Search ................... 378/43, 149, 2

[56] References Cited

U.S. PATENT DOCUMENTS 3,749,911 7/1973 Hoover et al. .................... 378/43
3,821,556 6/1974 Hoover ............................. 378/43

OTHER PUBLICATIONS

Underwood et al., "S056 X-ray Telescope Experiment on the Skylab Apollo Telescope Mount", *Applied Optics*, vol. 16, No. 4, Apr. 1977, pp. 858∝869.

Primary Examiner—Alfred E. Smith
Assistant Examiner—T. N. Grigsby
Attorney, Agent, or Firm—Joseph H. Beumer; John R. Manning; Leon D. Wofford, Jr.

[57] ABSTRACT

An X-ray telescope system comprises a tubular mount having a collecting region at one axial end for receiving X-rays from a remote source, and a detector region remote from the one axial end. A soft X-ray/XUV subsystem associated with the collecting region directs only relatively soft, near on-axis X-rays/XUV radiation incident on a first portion of the collecting region into a first detector sensitive to relatively soft X-rays/XUV radiation. A hard X-ray subsystem associated with the collecting region directs only relatively hard near on-axis X-rays incident on a second portion of the collecting region into a second detector sensitive to relatively hard X-rays.

21 Claims, 3 Drawing Figures

EXTENDED RANGE X-RAY TELESCOPE

ORIGIN OF THE INVENTION

The invention described herein was made by an employee of the U.S. Government and may be manufactured and used by or for the Government for government purposes without the payment of any royalties thereon or thereafter.

TECHNICAL FIELD

This invention relates to X-ray telescopes, and more particularly to X-ray telescopes designed for use on sounding rockets and satellites to investigate solar X-ray phenomena and cosmic X-ray sources.

BACKGROUND ART

U.S. Pat. No. 2,759,106 issued to Wolter discloses an image forming mirror system that utilizes nearly grazing incidence of X-rays for use in X-ray microscopy. Based on the work done by the patentee, high resolution, glancing incidence X-ray telescopes have been built and flown on numerous sounding rockets and satellites. One of the most popular designs is the so called Wolter I configuration which utilizes coaxial, common focal, internally reflecting, paraboloidal and hyperboloidal mirrors. In this configuration, relatively soft, substantially on-axis X-rays incident on the mirrors are converged at the prime focus of the telescope where a detector, sensitive to relatively soft X-rays, detects the glancingly reflected converged X-rays.

Glancing incidence X-ray mirror systems are highly effective over the soft x-ray/extreme ultra-violet (XUV) wavelength range from about 3 Angstroms to about 600 Angstroms producing high resolution focused images allowing the use of small low background detectors with extremely high signal-to-noise ratios. Below about 3 Angstroms, very small glancing angles are required, which means that very great focal lengths are necessary; and the collecting area becomes very small for a system of reasonable diameter. Consequently, glancing incidence X-ray mirror systems are not suitable for imaging hard X-rays and gamma rays.

In 1968, R. H. Dicke proposed an important technique for imaging hard X-rays. This technique involves the use of a plate opaque to hard X-rays pierced with a random ray of pinholes which produces an array of overlapping images at the focus plane. By knowing the configuration of the pinhole array, the many overlapping images can be deconvolved into a single useful image by either holographic methods or by digital processes utilizing a computer. This approach affords the advantage of the resolution of a single small pinhole coupled with the much larger collecting area made possible by the use of many apertures. When large separation distances between the multiple pinhole mask and the detector are used, superb resolution (i.e., about 0.1 seconds of arc) can be achieved for X-rays in the energy range from 1-100 KEV.

A simple random array of pinholes will function adequately under some conditions, but this is not the best type of coded aperture system. More sophisticated aperture systems are based upon the Hadamard matrices and offer the advantage of very flat sidelobes in the reconstructed image. Uniformly redundant arrays, described by E. E. Fenimore and T. M. Cannon, have autocorrelation functions with perfectly flat sidelobes and combine the advantages of the random array (i.e., high transmission characteristics) with those of the non-redundant pinhole arrays (i.e., flat sidelobes). Such approach permits the use of a smaller detector than required by the random array and yet allows imaging of low intensity, low contrast sources. A further increase in resolution at some loss in sensitivity can be achieved by the introduction of one or more coded aperture masks in front of the detector as described by R. B. Hoover and J. H. Underwood in U.S. Pat. No. 3,749,911.

In the past, it has been conventional to use one or the other of the two types of X-ray telescopes described above for separate investigations of relatively soft X-ray sources as well as relatively hard X-ray sources. An X-ray telescope system capable of simultaneously producing high resolution images in both the hard and soft X-ray regions would be ideally suited for imaging hard X-ray observation of emission associated with the impulsive phase of flares, coronal transients, and shock waves with precisely simultaneous high resolution images of the parent flare and associated loop systems at soft X-ray wavelengths in order to provide important new insights into the nature and characteristics of solar x-ray/XUV phenonmena. It is therefore a primary object of the present invention to provide a new and improved X-ray telescope which provides for simultaneously imaging soft and hard X-rays.

DISCLOSURE OF THE INVENTION

An X-ray telescope according to the present invention comprises a tubular mount having at one axial end, Wolter I or Wolter/Schwarzschild mirror configurations for soft X-rays/XUV (i.e., X-rays in the wavelength range from 3 to 600 Angstroms) for converging relatively soft, near on-axis X-rays/XUV incident on the mirror to a first detector sensitive to relatively soft X-rays/XUV located on the axis of the telescope at the prime focus thereof. A front stop located on the telescope adjacent the mirror configuration is configured to define an annular region through which X-rays from a remote location pass and impinge upon the mirrors which glancingly reflect only relatively soft X-rays/XUV radiation. The front stop effects the passage of only relatively hard X-rays which impinge upon a second detector sensitive to relatively hard X-rays located adjacent the first detector.

The front stop is in the form of overlying disks, one disk being of high Z metal and containing apertures for passing X-rays, and the other disk being of low Z metal for stopping relative soft X-rays whereby only relatively hard X-rays pass the front stop. The high Z metal disk is pierced with a random or carefully structured array of pinhole apertures, and preferably, a mosaic of uniformly redundant array patterns of pinholes.

With the above-described arrangement, the soft X-ray detector can be circular in form and located on the axis of the telescope, while the hard X-ray detector can be annular in form surrounding the first X-ray detector. This provides for a compact package for the telescope and combines all of the advantages of conventional soft and hard X-ray telescopes into an X-ray telescope system capable of producing simultaneous high resolution images in both the hard and soft X-ray wavelength regions. Such a system is ideally suited for studies of solar flares, coronal transients and shock waves, flare loops and active region loops, X-ray bright points, and coronal hole boundaries in connection with solar observations as well as cosmic investigations quasars, pulsars, neutron stars, super nova remnants, etc.

BRIEF DESCRIPTION OF THE DRAWINGS

An embodiment of the invention is illustrated in the accompanying drawings wherein.

DETAILED DESCRIPTION

Figure 3:
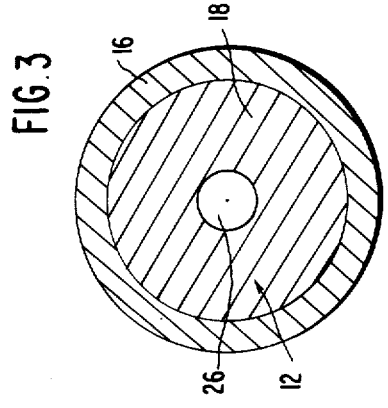
FIG. 3 is a plan view of the collecting regions of the telescope shown in FIG. 2.
Figure 1:
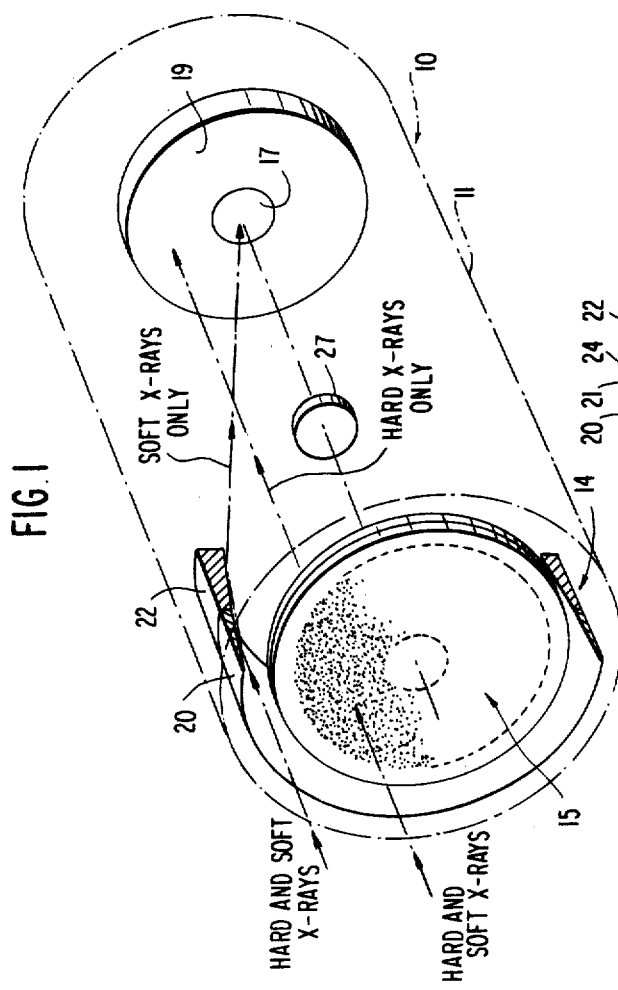
FIG. 1 is a perspective schematic view of the soft X-ray and hard X-ray subsections of an X-ray telescope in accordance with the present invention with some parts broken away for the purpose of more clearly showing the invention.
Figure 2:
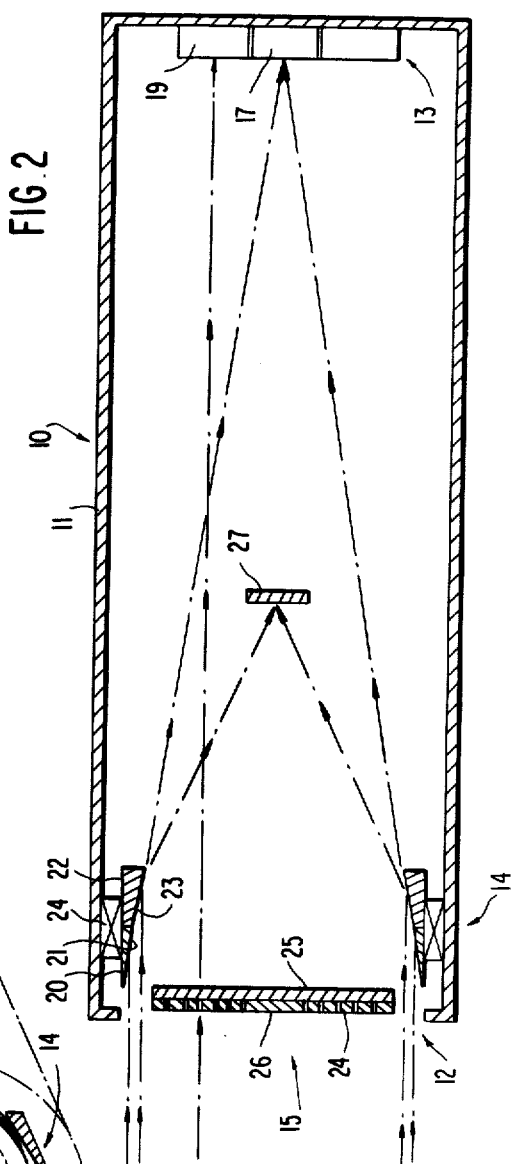
FIG. 2 is a cross-sectional view of the preferred form of the telescope according to the present invention.

Referring now to the drawings, reference numeral 10 designates an X-ray telescope system according to the present invention comprising a tubular mount 11, of graphite epoxy, beryllium, or other suitable structural materials, having collecting region 12 at one axial end for receiving X-rays from a remote source, and detector region 13 at the other axial end of mount 11. Associated with collecting region 12 are subsystems 14 and 15 which operate as discriminators with respect to X-rays from a remote source incident on collecting region 12. Subsystem 14 is a Wolter Type I or Wolter/Schwarzschild mirror configuration for directing only relatively soft, near on-axis X-rays incident on annular area 16 (FIG. 3) of the collecting region into detector 17 located on the axis of mount 11 in detector region 13 at the prime focus of subsystem 14. Subsystem 15, on the other hand, directs only relatively hard, near on-axis X-rays incident on annular area 18 lying inside annular area 16 of the collecting region into the annular detector 19 located in detector region 13.

Subsystem 14 comprises forward mirror 20 whose inner 21 face is paraboloidal, and rearward mirror 22 whose inner face 23 is hyperboloidal. Mirrors 20 and 22 are mounted on retainer 24 to tubular mount 11 in the vicinity of collecting region 12. The paraboloidal and hyperboloidal surfaces 21 and 23 define coaxial, confocal internal reflecting paraboloidal and hyperboloidal mirrors. For optimizing the wavelength coverage of the Wolter Type I system that constitutes subsystem 14, the mirrors may by either of fused silica or superpolished metal substrates coated with a final layer of gold having a thickness of approximately 1000 Angstroms.

Detector 17 may be a Chevron type sequential multichannel plate multiplier that utilizes a charge division readout device for responding to relatively soft X-rays/XUV in the range 3 Angstroms to over 600 Angstroms. Alternatively, other detectors such as thin, back-illuminated charge-coupled-devices can be utilized.

In operation, near on-axis, hard and soft X-rays from a remote source being studied by the telescope according to the present invention pass through annular area 16 of collecting region 12 and are incident on reflecting surfaces 21, 23. X-rays in the wavelength range from 3 Angstroms to several hundred Angstroms incident of the reflecting surfaces will be converged by the glancing incidence of the X-rays on the reflecting surfaces into detector 17 whose output will thus provide an image of the relatively soft X-ray emission portion of the source seen by the telescope. X-rays in the wavelength range below about 3 Angstroms require very small glancing angles for reflection to occur and are not converged by the reflecting surfaces 21, 23. Thus, the only X-rays that pass through annular area 16 and reach detector 17 will be relatively soft X-rays.

Those skilled in the art will recognize that subsystem 14 is constructed and operates as a conventional Wolter Type I X-ray telescope. In such a conventional telescope, a front stop is utilized for the purpose of defining, with the mirror structure, annular collecting area 16. In the present invention, however, the usual front stop is constituted by a portion of subsystem 15, namely a pair of overlying disks 24, 25 whose outer diameters define the inner diameter of annular collecting area 16.

Disk 24 is of high Z metal and contains a plurality of apertures in the form of pinholes for passing X-rays incident on the apertures. X-rays incident between apertures are absorbed by the disk 24 and do not pass therethrough. Disk 25, on the other hand, is of relatively low Z metal and serves to stop relatively soft X-rays that pass through the pinholes without affecting the passage of relatively hard X-rays.

The preferred material for disk 24 is tungsten because of its high mass absorption coefficient and density as well as its excellent structural rigidity. When the telescope is to be utilized for solar studies, where it is well known that the spectra of the impulsive phase of solar hard X-ray bursts have a cutoff at about 0.12 Angstroms (100 KEV), the tungsten disk should have a thickness of about 0.52 mm. in order to transmit no more than 1% of incident radiation. However, if it is permissible to allow a 5% transmission, then the thickness of the tungsten disk can be reduced to 0.34 mm. The thinner the tungsten disk, the easier it is to photoetch extremely small apertures which are a necessary part of subsystem 15.

Disk 25 which prevents soft X-rays from impinging on detector 19, is preferably a thin sheet of beryllium. A beryllium disk 0.5 mm. thick is essentially transparent to X-rays with a wavelength shorter than about 1.23 Angstroms so that the presence of this disk does not significantly reduce the effective area of hard X-ray imaging subsystem 15. If necessary to provide greater structural rigidity, the beryllium disk could be made as thick as 1 mm. and still allow transmission of greater than 90% of all X-rays of a wavelength shorter than 1 angstrom. This arrangement would afford better attenuation for soft X-rays providing a transmission of only 32% at 2.5 Angstroms. By proper choice of the thickness of the beryllium disk, no significant gap in the X-ray coverage between the hard and soft X-ray components of the telescope will be involved.

To prevent hard X-rays from impinging on detector 17, the central region 26 of tungsten disk 24 is not perforated with apertures. The area of central region 16 is only slightly larger than the area of detector 17 and represents an insignificant loss in the collection area of the telescope. However, by providing a solid central area, in disk 24, the structural integrity of this disk is improved. Further structural rigidity is obtained by providing a small annular region at the periphery of disk 24 that is free of apertures. This rim can be as small as 1 cm.

The precise configuration of the apertures in disk 24 is important to the overall performance of subsystem 15. In Dicke's original scatter hole camera, the apertures in a mask were configured in a random array. The many images so produced overlap such that a point in the detector plane receives photons from many different points in the object plane. This is referred to by communication theorists as "multiplexing". The point response function of this system is characterized by a peak sitting on the sidelobes of a pyramidal configuration. For a complex source such as the sun, the peak from one point source will be superimposed upon the accumulation of sidelobes from many other nearby point sources which gives rise to significant inherent noise in the system. This inherent noise can be removed by spacing the aperture sufficiently far apart such that no two images overlap; and in this case, the signal-to-noise ratio is given by $N^{0.5}$ where N is the number of apertures in the mask. The use of a random array of apertures spaced to prevent image overlap, therefore, significantly reduces the number of apertures that are available for passing X-rays. This necessarily results in a small collecting area for an extended complex source of hard X-rays.

Inherent noise in the hard X-ray subsystem telescope can be accomodated if provision is made for removing the noise by postexposure processing. It has been shown that a factor of 20 reduction in the sidelobes produced by a hard X-ray telescope utilizing a random array of pinholes can be achieved by a subtractive postprocessing technique. In such technique, two images are recorded simultaneously by means of two complementary coded aperture-plates. In one plate, apertures are randomly removed from half of the possible hole positions; and in the other plate, the inverse arrangement of apertures is provided. Using this arrangement, two images obtained from the plates are subtracted to form a pseudopicture which then may be digitally correlated with a pseudo-aperture formed by subtracting complementary aperture functions. This subtractive postprocessing method has the effect of creating a point response function with small random sidelobes that have a zero mean value.

While a random array of apertures in disk 24 may by suitable for some X-ray sources to be studied, such an array is not ideally suited to a complex source such as the sun even using the expedient described above. The preferred pattern for the apertures in disk 24 is what is termed uniformly redundant arrays because these have autocorrelation functions which exhibit perfectly flat sidelobes. Such arrays can have a very high transmission characteristic on the order of 50% and flat sidelobes which eliminate inherent noise problems encountered with random arrays. Thus, very low intensity sources can be imaged and low contrast sources are not obscured by inherent noise. By using uniformly redundant arrays, the hard X-ray subsystem can discern small contrast changes in very weak sources superpositioned on a strong background source. Furthermore, a uniformly redundant array can be configured of a mosaic of basic patterns which effectively forms a circular correlation of the object on a section of the detector plane 19. Consequently, all of the information necessary to determine the emission of the source is contained in an area the size of the basic pattern, thereby making it possible to use one or more smaller detectors such as the UXIscope described in *Nuclear Instruments and Methods*, Vol 158, Pgs. 175-180 (1979) by L. I. Yin, J. I. Trombka and S. M. Seltzer. Uniformly redundant arrays are described in *Applied Optics*, Vol. 17, No. 3, pages 337-347 (1978) in an article entitled "Coded Aperture Imaging With Uniformly Redundant Arrays" by E. E. Fenimore and T. M. Cannon.

As indicated previously a transmission of 50% is possible by using uniformly redundant array patterns. The size of the aperture should be as small as possible and for a 0.3 mm. tungsten disk, apertures of 25-50 microns in diameter can be produced by conventional photoetching methods. If the distance between apertured disk 24 and detector 19 is about 156 cm., each aperture of 50 microns in diameter will subtend an angle of 7 arc seconds. This is a resolution that would be achieved by the hard X-ray subsystem if it were possible to obtain a hard X-ray detector with a 50 micron spatial resolution. Scintillation crystals are usually utilized for hard X-ray detectors and with such systems, resolution is somewhere in the range of 10-20 arc seconds. However, sacrificing some collection area by producing a second mask in front of the detector, will probably achieve a resolution on the order of 7 arc seconds with existing detectors. The use of a second mask yields a system which still multiplexes the image but reduces the collection area somewhat.

In operating the hard X-ray subsystem with the extra mask, the Fourier component of the source profile is detected as the telescope scans past a small source. By determining the amplitude and phase of the fundamental Fourier component of the data, the source function can be derived from the inverse Fourier transform. A discussion of the signal to noise characteristics of such a Fourier transform telescope is found in *Proceedings of a Symposium of the 20th Planery Meeting of Cospar*, Tel Aviv Israel, June 7-18 1977 pages 277-289 published by Pergamon Press in an article entitled "Modulation Collimator as an Imaging Device" by K. Makishima, S. Miyamoto, T. Murakami, J. Nishimura, M. Oda, Y. Ogawara and T. Tawara.

Hard X-ray detector 19 is annular in shape and is located concentrically around soft X-ray detector 17. Because the disks 24, 25 and the detector 19 are integrally configured within tube 11, alignment problems are minimized.

To further protect soft X-ray detector 17 from hard X-rays, secondary stop 27 is utilized. The cross-sectional area of this stop is comparable to the area of unperforated portion 26 of disk 24 and the cross-sectional area of detector 17.

A practical embodiment of an X-ray telescope according to the present invention utilizes a graphite epoxy cylindrical tube about 1.6 m. in length with an outer diameter of approximately 36 cm. The soft X-ray subsystem 14 is a Wolter Type I or Wolter/Schwartzschild glancing incidence mirror system with superpolished reflecting surfaces coated with gold. The annular collecting area 16 for subsystem 14 would have an outer diameter of 32.828 cm. and an inner diameter of 32.000 cm. providing a geometrical collecting area of 43.16 cm.$^2$ and a focal length of 140 cm. The wavelength coverage afforded by the soft X-ray subsystem is in range 6.15 Angstroms to 600 Angstroms with a field of view of 40 arc minutes.

With regard to the hard X-ray subsystem, it employs a mosaic of uniformly redundant arrays in a tungsten sheet from 0.3-0.5 mm. thick backed by a solid beryllium plate 0.5 to 1 mm. thick. Annular collecting area 18 of this subsystem is defined by the perforated area which lies within an annular region having an outer diameter of 27.2 cm. and an inner diameter of 1.63 cm. defining a geometrical collecting area that is 289 cm.$^2$. For operation in the Fourier transform mode, the area would be half that, namely 144.5 cm.$^2$. The perforated area has 50% transmission utilizing either 25 micron or 50 micron apertures. The wavelength coverage afforded by the hard X-ray subsystem is 2.5 Angstroms to 0.1 Angstroms with a field of view of 40 arc minutes.

It is believed that the advantages and improved results furnished by the method and apparatus of the present invention are apparent from the foregoing description of the preferred embodiment of the invention. Various changes and modifications may be made without departing from the spirit and scope of the invention as described in the claims that follow.

I claim:

1. An extended range X-ray telescope system comprising:
   (a) a tubular mount having a collecting region at one axial end for receiving X-rays from a remote source, and a detector region separated from the collecting region;
   (b) a first subsystem associated with the collecting region for directing only relatively soft, near on-axis X-rays incident on a first portion of the collecting region into a first detector located at the detector region and sensitive to relatively soft X-rays; and
   (c) a second subsystem associated with the collecting region for directing only relatively hard near on-axis incident on a second portion of the collecting region into a second detector located at the detector region and sensitive to relatively hard X-rays.

2. An extended range X-ray telescope according to claim 1 wherein a first portion of the collecting region is an annular area and the first subsystem includes coaxial, confocal internally reflecting paraboloidal and hyperboloidal mirrors for converging relatively soft, near on-axis X-rays passing through the annular area and incident on the mirrors, the first detector being located on the optical axis of the mirrors at the prime focus of the first subsystem for receiving converging X-rays glancingly reflected by the mirrors.

3. An extended range X-ray telescope according to claim 2 wherein the second subsystem includes a front stop whose outer periphery defines a part of the annular area that constitutes the first portion of the collecting region, a second portion of the collecting region being constituted by at least a portion of the front stop, and means on the front stop for effecting passage of only relatively hard X-rays, the second detector being located adjacent the first detector at substantially said prime focus for receiving X-rays that pass through the front stop.

4. An extended range X-ray telescope according to claim 3 wherein the front stop is in the form of overlying disks, one disk being of high Z metal and containing apertures for passing X-rays, and the other disk being of low Z metal for stopping relatively soft X-rays whereby only relatively hard X-rays passing through the apertures in the high Z metal disk pass through the front stop.

5. An extended range X-ray telescope according to claim 3 wherein the high Z metal is tungsten.

6. An extended range X-ray telescope according to claim 5 wherein the low Z metal is beryllium.

7. An extended range X-ray telescope according to claim 6 wherein the high Z metal disk is forward of the low Z metal disk.

8. An extended range X-ray telescope according to claim 4 wherein said one disk is forward of said other disk.

9. An extended range X-ray telescope according to claim 8 wherein the apertures in said one disk cover a predetermined portion of the disk and define a collecting area.

10. An extended range X-ray telescope according to claim 9 wherein the collecting area in said one disk is a mosaic of uniformly redundant array patterns.

11. An extended range X-ray telescope according to claim 9 wherein the collecting area of said one disk is a random array of apertures.

12. An extended range X-ray telescope according to claim 10 wherein the second detector is annular in shape and surrounds the relatively soft X-ray detector.

13. An extended range X-ray telescope according to claim 12 including a second axially located stop opaque to hard X-rays and substantially equal in size to the first detector, the second stop being located between the second detector and the front stop for shielding the first detector from hard X-rays.

14. An extended range X-ray telescope according to claim 13 wherein said predetermined portion of said one disk is annular in shape, the inner diameter of said predetermined portion being substantially equal to the outside diameter of the second stop.

15. An extended range X-ray telescope according to claim 14 wherein the outer diameter of the apertures region in said one disk is less than the outer diameter of the disk itself.

16. An extended range X-ray telescope according to claim 15 wherein said one disk is a tungsten plate no greater than about 0.52 mm. thick.

17. An extended range X-ray telescope according to claim 16 wherein said other disk is a beryllium plate at least 0.5 mm. thick.

18. An extended range X-ray telescope according to claim 16 wherein the first detector is a charge-coupled-device.

19. An extended range X-ray telescope according to claim 16 wherein the first detector is a Chevron type sequential multichannel plate multiplier.

20. An extended range X-ray telescope according to claim 16 wherein the second detector is a scintillation crystal.

21. An extended range X-ray telescope according to claim 16 wherein the second detector is at least one UXIscope.

* * * * *